United States Patent [19]
Allport

[11] 3,777,980
[45] Dec. 11, 1973

[54] IRRIGATION FITTING

[76] Inventor: Davies Allport, 966 Muirlands Vista Way, La Jolla, Calif. 92037

[22] Filed: Nov. 3, 1972

[21] Appl. No.: 303,521

[52] U.S. Cl. ............................... 239/272, 239/542
[51] Int. Cl. ............................................. A62c 23/06
[58] Field of Search .................... 239/534, 535, 542, 239/547, 118, 107, 110, 111, 272

[56] References Cited
UNITED STATES PATENTS

| | | | |
|---|---|---|---|
| 2,953,168 | 9/1960 | Vomacka | 239/107 |
| 2,563,300 | 8/1951 | Aker | 239/272 |
| 2,088,614 | 8/1937 | Schey | 239/535 |
| 519,992 | 5/1894 | Everest | 239/107 |
| 1,758,119 | 5/1930 | LeMoon | 239/107 |
| 3,269,664 | 8/1966 | Lamb et al | 239/272 |

*Primary Examiner*—Lloyd L. King
*Attorney*—Keith D. Beecher

[57] ABSTRACT

A fitting is provided which is intended to be inserted into a water pipe to supply irrigation water in controlled limited amounts to the root zone of plants. The fitting consists of a hollow cylinder with an inlet hole located in the center of one end of one cylinder and an outlet hole located in the center of the other end. The diameter of the entrance and outlet holes are considerably smaller in diameter than the hollow cavity within the cylinder and they are all located coaxially over the same centerline. The inner wall of the cavity on the outlet end of the cylinder is conical in shape in such a way that a flat resilient disc held lightly against this face will be in contact with the face only around its circumference. Additional pressure across the face of the disc will cause the disc to deform into the conical face which forms a seat for the disc. When water pressure is applied to the fitting a pressure differential across the disc results and the disc is forced against its seat and would seal the outlet hole and prevent water from passing if the surface of contact were smooth. However, these surfaces are textured so that water can seep across the seat in a multiplicity of restricted paths and flow out the outlet hole. The amount of water flow at any one pressure is determined by the size and shape of the textured pattern. When the water is turned off the disc pulls away from its seat and returns to its original flat shape and when water is again turned on, a small amount of water becomes entrapped in the seat area and as pressure builds up, the entrapped water is extruded out of the seat area through the outlet hole, flushing any solids that may tend to clog the restricted paths.

5 Claims, 4 Drawing Figures

PATENTED DEC 11 1973   3,777,980

IRRIGATION FITTING

BACKGROUND OF THE INVENTION

Irrigation of crops is well known and has been in use since early history. Some irrigation systems which are currently in wide use are field flooding, furrow flooding, and sprinkler systems. These methods waste water, wash away nutrients, compact the soil, aid the growth of weeds, promote disease, require considerable labor to operate, and do not supply water at desirable rates. In order to reduce these problems, trickle irrigation is becoming widely used.

Unlike other systems that distribute excessive water over wide areas, trickle irrigation applies water at a slow, controlled rate to the root zone of the crop. Typically this is accomplished by supplying a small water outlet that allows a limited dripping or flowing of water at two gallons per hour for large plants, and one third of one gallon or less per hour for some row crops. As evaporation, run-off, over-watering, and watering beyond the root zone is eliminated, water savings are often 50 percent or more.

Additionally, trickle irrigation benefits include savings in fertilizers and chemicals which may be applied with the water without being washed away, improved quantity and quality of crops, and fewer salt deposits in the root zone because less water is used.

The two trickle irrigation types in general use today are continuous unit, and fittings. Continuous units are pipes or hoses which are made of a porous material such as a fabric that weeps, or which are made from non-porous material with water outlet holes spaced along their length. Since the pores or outlet holes in the prior art assemblies must be small in order to maintain the desirable flow rates, they tend to become clogged with silt or precipitating chemicals carried in the water.

Fittings are usually designed with long restricting passages through which the water must pass to the outlet. As the restricting passage is long, its cross sectional area may be larger and thus less susceptible to clogging. Fittings, however, are more costly per water outlet than the continuous systems in use.

DETAILED DESCRIPTION OF THE ILLUSTRATED EMBODIMENT

Figure 1:
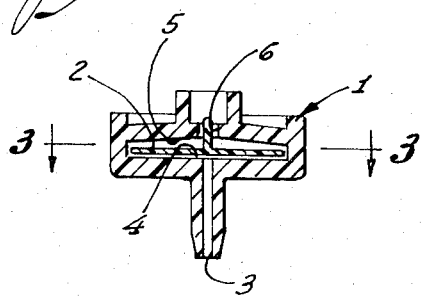
FIG. 1 is a sectional view of an emitter fitting in accordance with this invention, the fitting being illustrated in its non-operational state.
Figure 2:
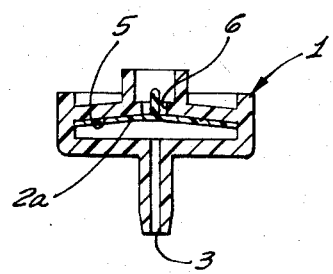
FIG. 2 is a sectional view of the fitting of FIG. 1, but in its operational state.

A sectional view of an emitter fitting is shown in FIG. 1 with the body designated 1 and the resilient disc designated 2. The body 1 may be composed of rigid plastic such as polyvinylchloride (PVC), or other suitable material. The resilient disc may be plastic, such as polyurethane. The body 1 is provided with an inlet hole 3 which extends into an interior cavity 4 within the body through a hollow stem formed integral with the body. One wall of the cavity 4 forms a conical-shaped seat 5, and an outlet hole 6 extends through the seat. This view shows the fitting in the non-operational state with the disc 2 flat and not forced against the seat 5. FIG. 2 is a sectional view of the emitter fitting of FIG. 1 in the operating state with the resilient disc 2 held against the seat 5 of the body 1 by water pressure. The disc may be equipped with an integral stem, as shown, which extends into the hole 6 for centering purposes.

Figure 3:
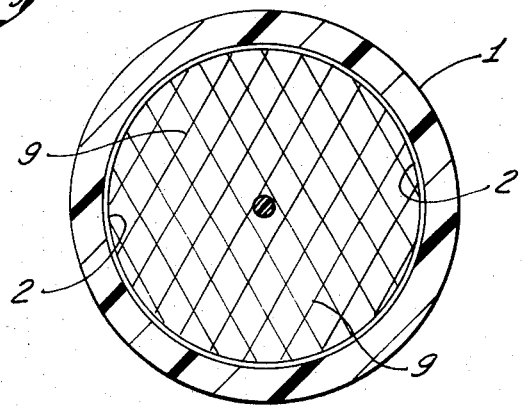
FIG. 3 is a section taken along the line 3—3 of FIG. 1, and showing a textured pattern of an internal component of the fitting which is used in regulating the flow of water through the fitting.

FIG. 3 is a view showing the depressions in the textured seating surface 9 of the disc 2. When the disc 2 is in the operational state and held against the seat 5 of the body 1 as shown in FIG. 2, the water may flow around the edge of the disc 2 and into the restricted areas formed by the depressions of the surface 9 and proceed across the face of the seat 5 until discharged out of the center outlet hole 6. The restricted passages of the surface 9 may be provided on the disc 2 as shown, or on the seat 5 of the body 1 or on both.

The flow rate at any one water pressure is determined by the size, shape and number of restricted passages. Therefore, the emitter may be manufactured to meet the flow rates required for irrigation of all crops in all types of soils. With the disc made of a resilient material, water pressure deforms the textured surface 9 reducing the size of the passages, thus further restricting flow and providing a constant flow over variable pressure.

Figure 4:
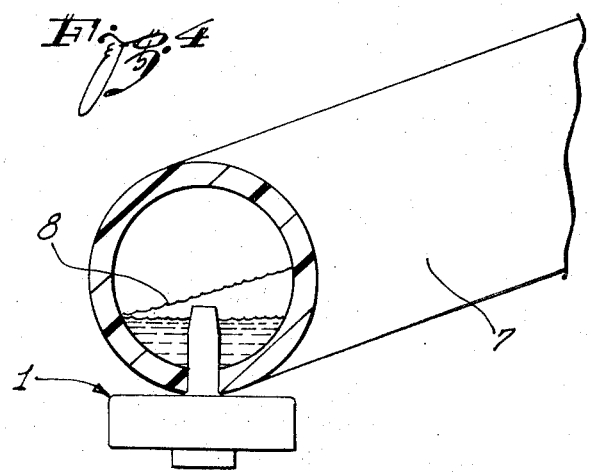
FIG. 4 is a sectional view of a pipe fitted with an emitter fitting of the type shown in FIG. 1.

FIG. 4 is a sectional view of an irrigation water pipe 7 which has a hole provided in its wall into which the step of the emitter fitting 1 has been pressed. When so used, an area 8 within the pipe 7 is provided for the storage of sand, silt and solids that settle to the bottom. Clogging of emitter devices is a major problem and such solids are a common cause of clogging.

The design of the multiplicity of restricted paths on the surface 9 of the resilient disc 2 starting from many points around the circumference of the disc insures the flow of water even if many of these passages are clogged.

Further assurance of continued operation is obtained by the flexing of the disc 2 every time the water is turned on or off. This movement not only tends to break up solids that might be deposited on the disc 2 or its seat 5, but also when the water is turned on and pressure builds up a small quantity of water becomes entrapped between the disc 2 and its seat 5 and this water is extruded as pressure causes the disc to conform to the shape of its seat 5.

The invention provides, therefore, an improved irrigation fitting for use in trickle-type irrigation systems, which is simple to make and to install and which is virtually clog-proof.

While a particular embodiment of the invention has been shown and described, modifications may be made, and it is intended to cover such modifications in the following claims.

What is claimed is:

1. A fitting for the distribution of irrigation water, and the like, in controlled amounts, comprising: a housing forming an inner cavity having an inlet opening at one end and an outlet opening at the other end, the wall of the cavity at said other end forming a seat; a disc member located in said cavity in position to have a surface retained against the surface of said seat to block said outlet opening by pressure of water entering said cavity through said inlet opening, and at least one of said surfaces being textured to provide a multiplicity of restricted paths to allow water to seep around the disc from said cavity to pass out through said outlet opening.

2. The assembly defined in claim 1, and which includes a hollow stem integral with said housing and forming said inlet opening, said stem permitting the fitting to be plugged into a hole in an irrigation pipe.

3. The assembly defined in claim 1, in which the surface of said disc adjacent said seat is textured.

4. An assembly defined in claim 1, in which the seat is conical in shape, and the disc member is made of flexible material, such that water pressure conforms the disc to the shape of the seat, and such that the disc pulls away from the seat and returns to its original flat shape when the water pressure is discontinued.

5. An assembly defined in claim 3, in which the disc is made of resilient material, so that as water pressure builds up in the cavity the textured surface of the disc is deformed so as to reduce the size of the restricted passages across said surface so as to obtain a substantially constant flow of water through the fitting in the presence of changes in water pressure.

* * * * *